United States Patent [19]

Claborn

[11] Patent Number: 4,712,363
[45] Date of Patent: Dec. 15, 1987

[54] APPARATUS FOR CONVERTING A FLEXIBLE LINE TRIMMER FOR USE AS A LAWN EDGER

[75] Inventor: Morris W. Claborn, Dallas, Tex.
[73] Assignee: Wedger, Inc., Dallas, Tex.
[21] Appl. No.: 906,516
[22] Filed: Sep. 12, 1986
[51] Int. Cl.⁴ .......................................... A01D 34/84
[52] U.S. Cl. .................................. 56/16.7; 56/12.7; 172/13; 172/17
[58] Field of Search ............... 56/12.7, 16.7, 16.9, 56/17.2; 172/13, 14, 17; 180/19.1

[56] References Cited

U.S. PATENT DOCUMENTS

| | | |
|---|---|---|
| 3,587,749 | 6/1971 | Sauer . |
| 3,620,307 | 11/1971 | Vilela .................................. 172/17 |
| 3,679,003 | 7/1972 | Wadsworth ....................... 172/17 |
| 4,182,100 | 1/1980 | Letter . |
| 4,205,439 | 6/1980 | Sweet . |
| 4,224,784 | 9/1980 | Hansen et al. . |
| 4,287,709 | 9/1981 | Lowry et al. . |
| 4,343,139 | 8/1982 | Lowry et al. . |
| 4,364,435 | 12/1982 | Tuggle et al. ...................... 56/172 |
| 4,389,836 | 6/1983 | Lowry et al. . |
| 4,411,126 | 10/1983 | Lowry et al. . |
| 4,442,659 | 4/1984 | Enbusk . |
| 4,512,143 | 3/1985 | Jimenez . |
| 4,531,350 | 7/1985 | Huthmacher . |
| 4,624,321 | 11/1986 | Pinto .................................. 56/16.7 |

FOREIGN PATENT DOCUMENTS 1551622  8/1979  United Kingdom ................ 56/12.7

Primary Examiner—Robert P. Swiatek
Assistant Examiner—John Weiss
Attorney, Agent, or Firm—Daniel V. Thompson

[57] ABSTRACT

An apparatus is provided for conversion of a flexible line trimmer for use as a lawn edger by attachment of a plate and wheels to a flexible line trimmer, said plate acting as a support seating a flexible line trimmer and maintaining position and orientation of a trimmer cutting path.

11 Claims, 8 Drawing Figures

APPARATUS FOR CONVERTING A FLEXIBLE LINE TRIMMER FOR USE AS A LAWN EDGER

TECHNICAL FIELD

The present invention relates to an apparatus for converting a flexible line trimmer for use as a lawn edger by attaching a wheeled plate to the trimmer.

BACKGROUND ART

Hand-held flexible line trimmers are light tools used for maintenance of lawns. Lawns regular in height and uniformly trimmed are desirable in today's society. Presently, in order to achieve the quality yard desired, several pieces of yard equipment must be employed, i.e., mowers, edgers, trimmers, etc. No single machine capable of performing all yard functions exists on the market today. Current machinery has existed without substantial design change for a substantial period of time thus inferring that with regard to basic lawn equipment optimal designs have been reached. Consequently, a need exists for adapting or converting existing designs so as to perform several lawn maintenance functions, thereby minimizing the need for several pieces of lawn equipment and thus reducing cost of maintenance for the general home owning public.

Various carriages for converting flexible line trimmers for use as lawn mowers are known in the art. Certain of these devices, such as U.S. Pat. Nos. 4,287,709, 4,343,139, 4,389,836, and 4,411,126 to Lowry et al. and U.S. Pat. No. 4,531,350 to Huthmacher, contemplate wheeled frames on which the line trimmer rests thus maintaining a uniform cutting path height. Specifically, the trimmer is attached directly to the frame of the particular apparatus or rests on a platform attached to the apparatus frame. Devices utilizing the platform configuration maintain a large hole centered in the platform through which the lines spool and thus the cutting edges extend.

Further, the prior art includes the device shown in U.S. Pat. No. 4,512,143 to Jimenez. Jimenez teaches a carriage for line trimmers having a frame resting on tubular runners which act as skids. The trimmer attaches to the frame and the skids provide a reference to the ground providing a uniform cutting path height for mowing a lawn.

Complete pieces of lawn equipment are taught by U.S. Pat. No. 4,205,439 to Sweet. These patents teach a motor and handle, with a boom attached thereto supporting a head assembly having a cutting element. In each of these patents, the motor drives the cutting element through the boom.

The prior art also teaches dollies for converting flexible line trimmers for use as mowers and edgers. In particular, U.S. Pat. No. 4,442,659 to Enbusk teaches a dolly having a pair of wheels supporting a handle and pivotal mount to which the trimmer boom is attached. The mount pivots reacting to the control of the user as the operator moves the dolly forward. The operator controls orientation of the cutting path, consequently several degrees of freedom must be maintained by the operator, and thus, the desired uniform cutting path is difficult if not impossible to achieve. U.S. Pat. No. 4,182,100 to Letter teaches an elaborate three-wheeled frame on which the line trimmer rests. In Letter's initial configuration the trimmer acts as a mower. Further, the trimmer is attached to a pivoting handlebar and the extended trimmer boom attaches to the front of the frame. By applying pressure to the handlebars the trimmer may be rotated so as to provide a lawn edging cutting path. Once again, a multiple degree of freedom system necessitates that an inordinate amount of control to be exercised by the operator in order to maintain a uniform lawn edge.

Prior art also teaches a configuration for converting an electric power saw for use as a lawn edger. U.S. Pat. No. 3,587,749 to Sauer teaches a wheeled carriage and handle to which the power saw is attached. The blade of the power saw extends to one side of the carriage providing a cutting edge suitable for lawn edging.

The prior art further teaches a conversion device for attachment to a line trimmer U.S. Pat. No. 4,224,784 to Hansen et al. teaches a device with two legs forming a triangular frame extending and providing axes for two wheels. The frame is attachable to the line trimmer by means of a mounting collar, but is configured to fit line trimmers having only specific dimensions. Hansen's device lacks unversality, a highly advantageous feature for a device intended for use with pre-existing line trimmers.

Consequently, a need presently exists for an attachable conversion device which universally will fit all flexible line trimmers available, including electric and gas powered trimmers. Further, a need exists for a device which is lightweight and adapted to allow use of the trimmer in either a near-vertical or a horizontal mode without removing the device. Finally, the device should provide for trimming in a plane tilted away from the operator to reduce the nuisance and hazard of flying debris.

SUMMARY OF THE INVENTION

The invention comprises a novel attachment for a flexible line trimmer that includes in a first embodiment a wheeled wheel-plate and a wedge-shaped mounting-plate translatably and fixably attached to each other. The wheel-plate includes a lip proximate the wheels and slots for engaging a strap. The mounting-plate includes a wedge member having converging flanges for providing lateral stability and adjustability. The wheel-plate and mounting-plate are configured such that the lip, flanges and strap may be used to facilitate attachment to any conventional electrically-powered line trimmer. Provision is also made for attachment to a gas-powered trimmer. In a second embodiment of the invention, lateral stability and adjustability are provided by opposed flanges pivotally connected to the wheel-plate.

BRIEF DESCRIPTON OF THE DRAWINGS

A more complete understanding of the invention and its advantages will be apparent from the Detailed Description taken in conjunction with the accompanying Drawings, in which.

DETAILED DESCRIPTION

Figure 1:
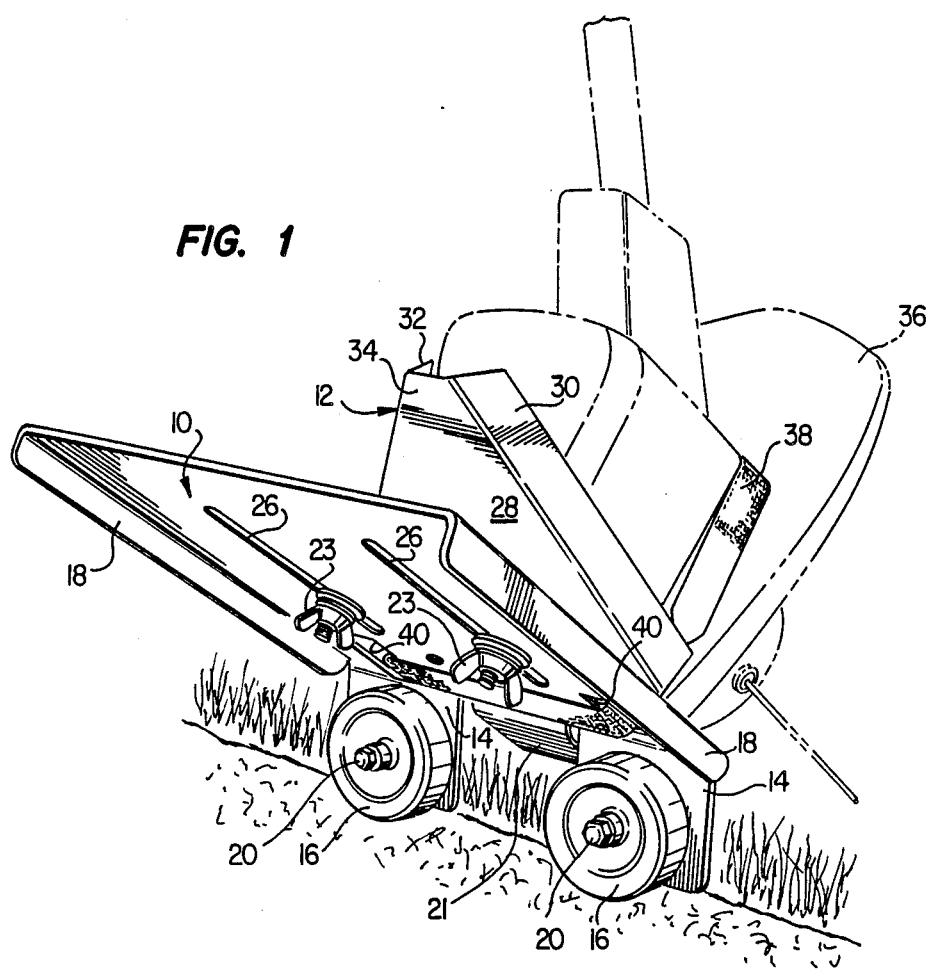
FIG. 1 is a perspective view of the first embodiment of the invention mounted to an electrically-powered flexible line trimmer in the near-vertical mode.
Figure 2:
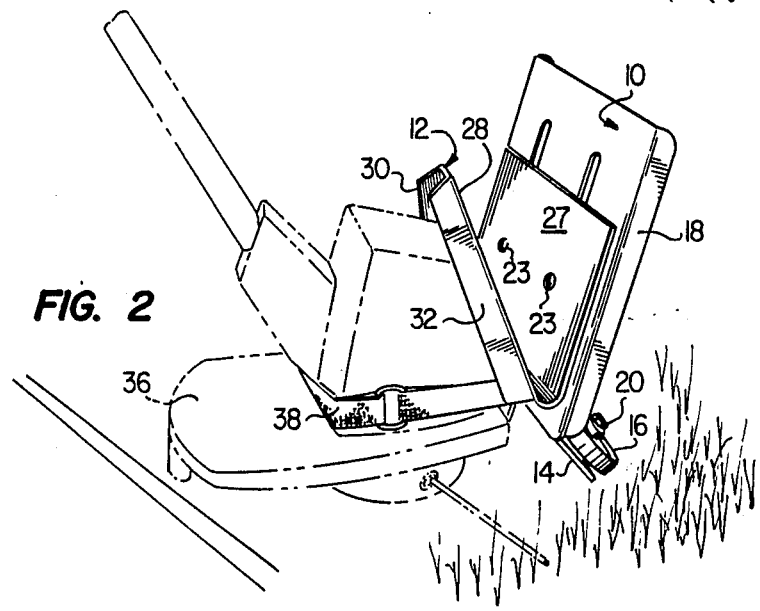
FIG. 2 is a perspective view of apparatus of FIG. 1 being used in the horizontal mode.
Figure 3:
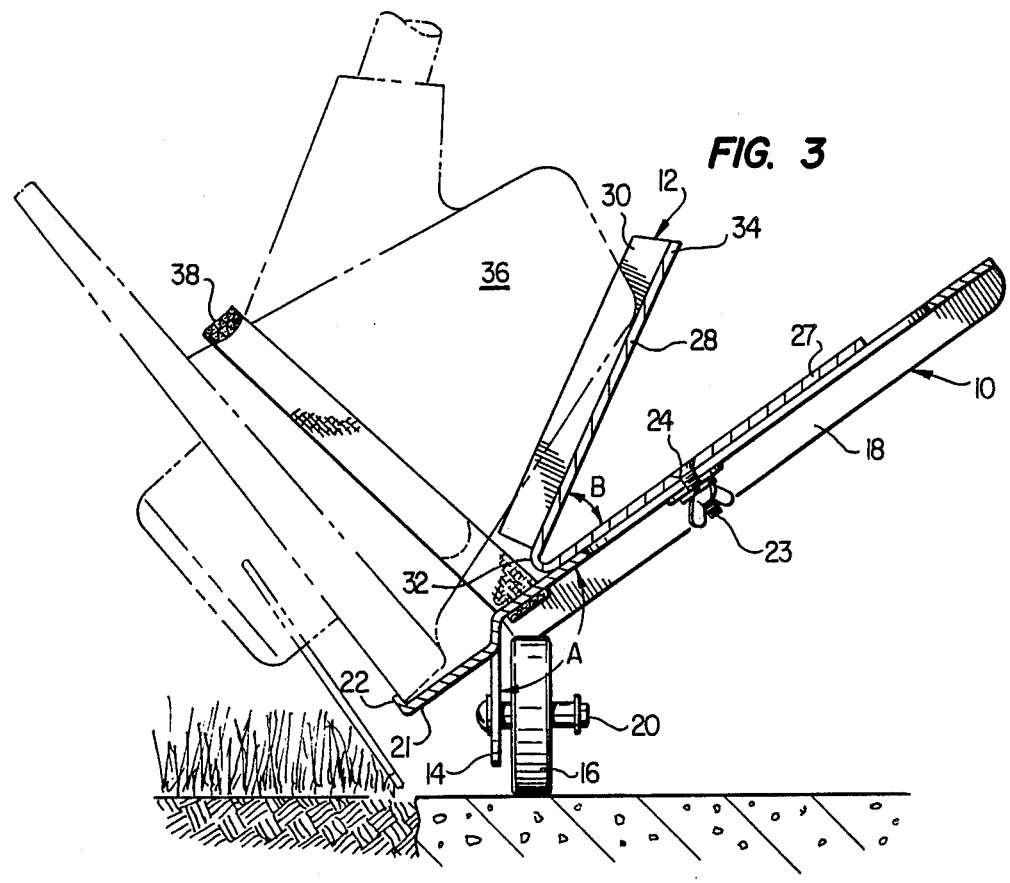
FIG. 3 is a partially broken away side view of the apparatus of FIGS. 1 and 2.
Figure 7:
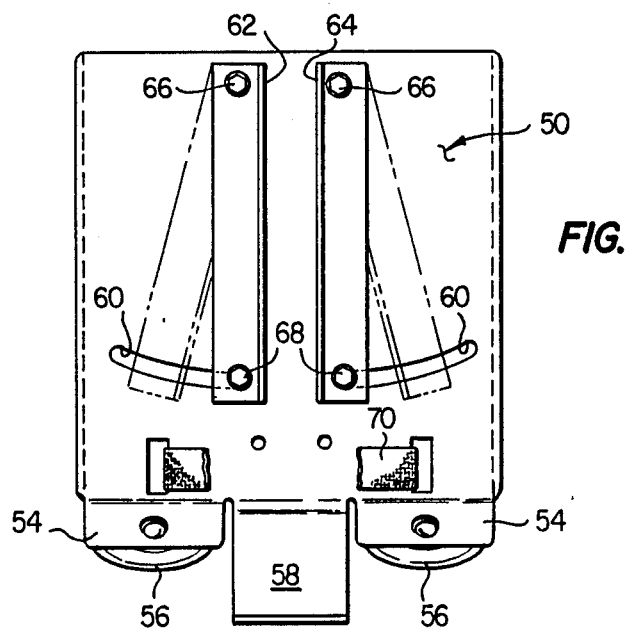
FIG. 7 is a bottom view of the apparatus of FIGS. 4, 5 and 6.
Figure 4:
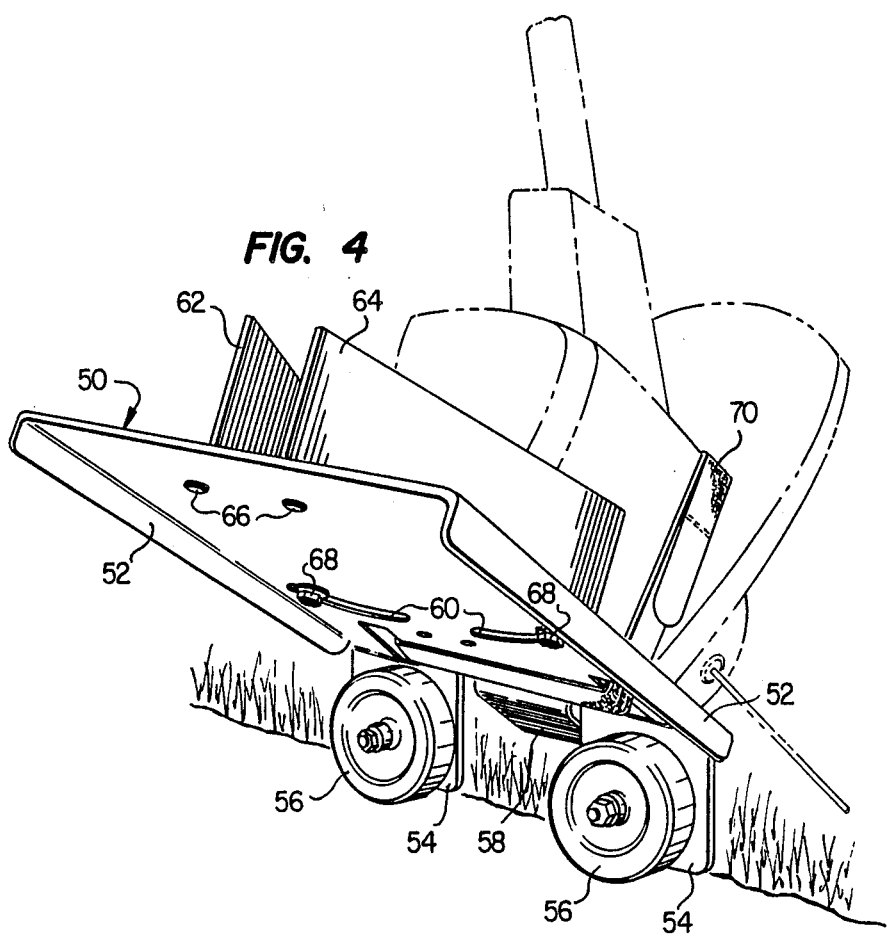
FIG. 4 is a perspective view of the second embodiment of the invention mounted to an electrically-powered flexible line trimmer in the near-vertical mode.

Referring initially to FIGS. 1, 2 and 3, the first embodiment of the invention includes wheel-plate 10, and mounting-plate 12. Coplanar struts 14 extend from wheel-plate 10 and support wheels 16 for rotation about coplanar axes perpendicular to struts 14. In this embodiment, the included angle A (FIG. 3) between the planes of wheel plate 10 and struts 14 is 135°. Preferably, the wheel-plate 10 is made of a single sheet of aluminum or some other lightweight material offering the stiffness required. Wheel-plate 10 includes stiffening flanges 18 located laterally along the sides thereof enhancing stiffness of the wheel-plate 10 and offering a margin of protection for the operator from trimmer discharge debris. The wheels are attached to struts 14 by fasteners 20 fixed along the wheel axes.

The wheel-plate 12 also includes an arm 21 extending therefrom and centrally located between struts 14. Arm 21 includes lip 22 at the end thereof. Lip 22 is turned at a right angle to arm 21 and extends in a direction away from wheels 16.

Mounting-plate 12 is translatably attached to the wheel-plate 10 by means of fasteners 23 extending through counter-sunk holes 24 in mounting-plate 12 and adjustment slots 26 in wheel-plate 10. Preferably, fasteners 23 each includes a conical-headed machine screw, flat washers and a wing nut. The fasteners 23 may be loosened and the fixed relation between the mounting-plate 10 and wheel-plate 10 may be adjusted via the adjustment slots 26.

Mounting plate 12 also includes planar connection portion 27 and a wedge portion 28 extending at an angle B (FIG. 3) therefrom at intermediate fold 29. In preferred form, angle B is 40°. Wedge portion 28 also includes wedging flanges 30 extending at right angles away from wedge portion 28. Flanges 30 and 32 converge from an area of widest separation located adjacent fold 29. The area of least separation of flanges 30 and 32 is located adjacent to or at end 34. In preferred form, flanges 30 and 32 converge at an included angle of 50°. Flanges 30 and 32 centrally located with respect to fold 29 such that the angles between flanges 30 and 32 and fold 29 are equal and opposite.

The wheel-plate 10 and mounting-plate 12 are fastened to an electrically-powered trimmer 36 by running a mounting-strap 38 through the mounting-strap slots 40 in wheel-plate 10 and around the trimmer housing. The mounting-strap is secured by means of a hook and loop fastener with such force as to maintain preferred positioning between device and trimmer. The mounting plate 12 may be adjusted and then fixed by fasteners 23 so as to maintain contact between lip 22 and the trimmer housing. Lip 22 provides a seat for the trimmer so as to maintain a uniform orientation and cutting path. Lateral stability of the trimmer is enabled by the engagement of flanges 30 and 32 with the trimmer housing.

Referring now to FIGS. 4, 5, 6 and 7, a second embodiment of the invention includes wheel-plate 50, which is identical to wheel-plate 10 shown in FIGS. 1, 2 and 3 with respect to stiffening flanges 52, struts 54, wheels 56, arm 58 and lip 59.

The second embodiment wheel-plate includes arcuate slots 60 in lieu of elongated slots. Flanges 62 and 64 are comprised of right angle members pivotably attached to wheel-plate 50 at pivots points 66. Fasteners 68 are provided through the flanges 62 and 64 for engagement with arcuate slots 60. A strap 70 is provided similar to strap 38 in FIGS. 1, 2 and 3.

Adjustability and lateral engagement with a trimmer are provided in the second embodiment by loosening fasteners 68 and pivoting flanges 62 and 64 into contact with the trimmer housing. Strap 70 and lip 59 are analogous to strap 38 and lip 22 in the first embodiment.

Figure 8:
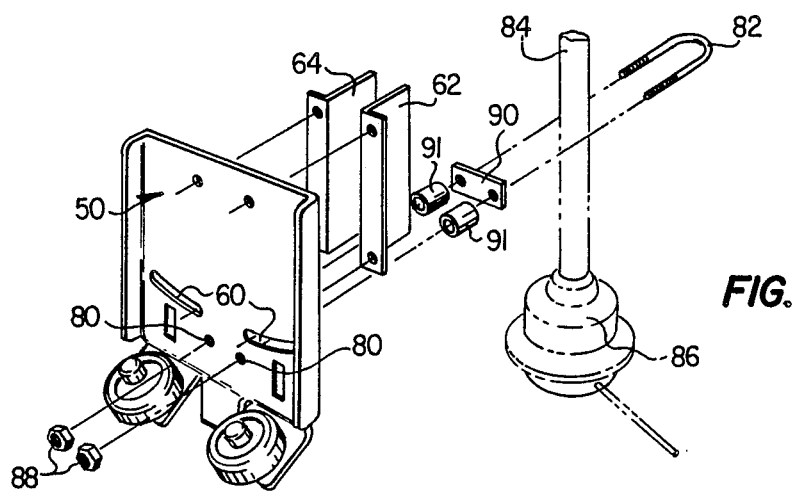
FIG. 8 is an exploded view of the invention attached to the boom of a gas-powered flexible line trimmer.

Referring now to FIG. 8, the wheel-plate 50 also includes holes 80 for engagement with a U-bracket 82. U-bracket 82 is sized to engage the boom 84 of a gas powered trimmer 86 and is secured by means of bracket-nuts 88. Orientation of wheel-plate 10 is controlled by locating U-bracket 52 on the line trimmer boom 84 through plate 90 and two-inch spacers 91 and securing said position by tightening bracket-nuts 88. The embodiment of FIGS. 1, 2 and 3 can be similarly provided with means for attachment to a gas-powered trimmer.

Figure 5:
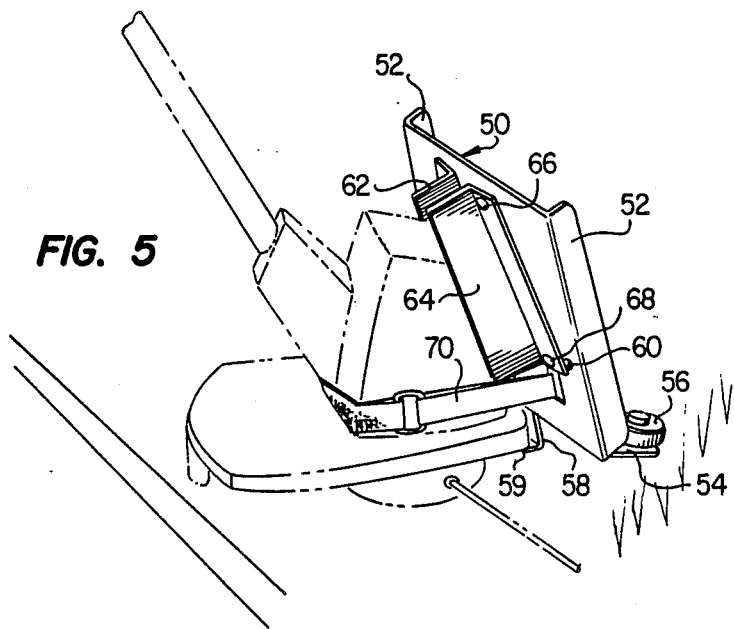
FIG. 5 is a perspective view of the apparatus of FIG. 4 being used in the horizontal mode.
Figure 6:
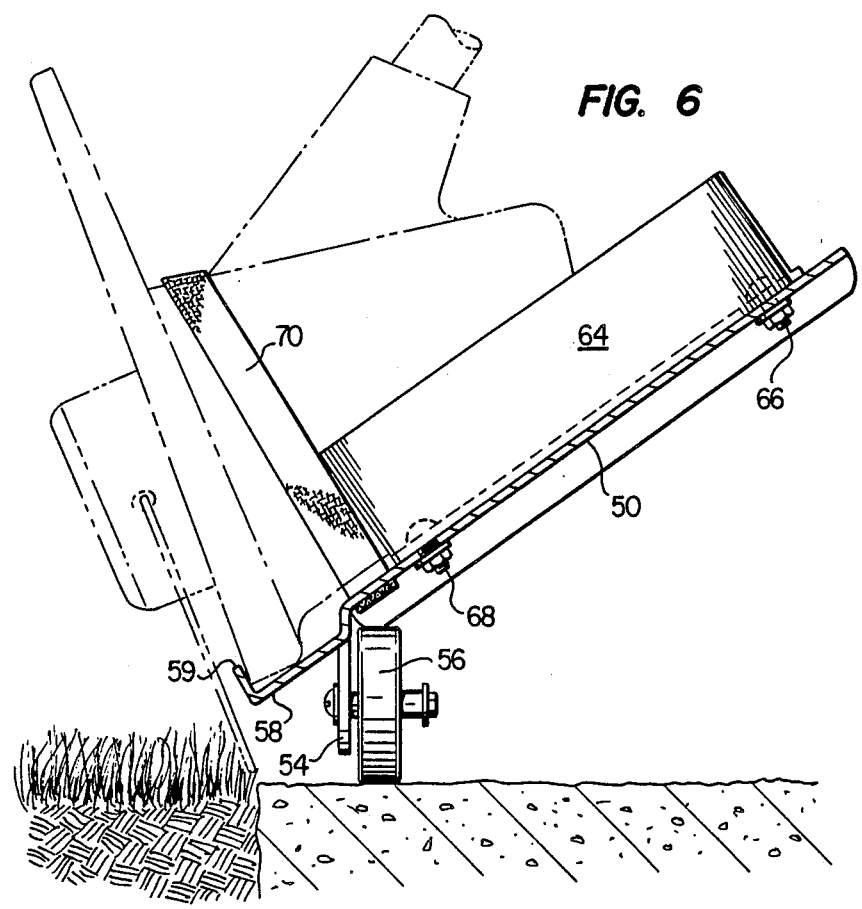
FIG. 6 is a partially broken away side view of the apparatus of FIGS. 4 and 5.

In operation, substantially any trimmer housing may be fixed to the device through contact at four distinct points: the strap, the lip on the wheel-plate and the two flanges. The flanges provide lateral stability and adjustibility, and the lip and strap provide points for the flanges to act against. To initially fit a trimmer with the device, the forward edge of the trimmer housing is located against the lip, the strap tightly connected, and then the flanges are firmly wedged against the trimmer housing while the fasteners are tightened. The trimmer is usable in the near-vertical mode shown in FIGS. 1, 3, 4 and 6 to trim the edge of a lawn along, for example, a sidewalk. The wheels support the trimmer on the edge of the sidewalk, enabling the operator to obtain a uniform edge. The trimmer may be used in the horizontal mode, as shown in FIGS. 2 and 5, by merely inverting the trimmer with the device still attached. It can thus be seen that use of the trimmer in either mode can be readily accomplished without removing the device, and it is intended that the device be of such minimal weight that no substantial additional effort will be required when using the trimmer in the horizontal mode.

Having described the invention, it will be apparent to those skilled in the art that various modifications may be made therein without departing from the spirit and scope of the present invention as defined in the appended claims.

I claim:

1. An apparatus for converting a flexible line trimmer for use as a lawn edger comprising:
   (a) a wheel-plate including:
      a planar sheet member;
      first and second struts extending from an edge of said sheet member and being disposed at an obtuse angle with respect to said sheet member;
      a wheel attached to each of said struts;
      an arm extending from said edge of said sheet member; and
      a lip extending from an end of said arm;
   (b) first and second flange members each having a flange surface;
   (c) fasteners to adjustably and fixably connect said wheel-plate and said first and second flange members;

(d) a strap connected to said wheel-plate and having means for fastening the strap around the flexible line trimmer; and (e) said lip, flange surfaces and strap being located to connect the apparatus to a flexible line trimmer.

2. The apparatus of claim 1 wherein opposed edges of said sheet member are folded at right angles to form first and second stiffening flanges.

3. The apparatus of claim 1 wherein first and second portions of said edge of said sheet member are folded at said obtuse angle with respect to said sheet member to form said first and second struts.

4. The apparatus of claim 3 wherein said wheels are attached to each of said struts for rotation about an axis perpendicular to said struts.

5. The apparatus of claim 3 wherein said arm is formed of a third portion of said edge intermediate of said first and second portions of said edge.

6. The apparatus of claim 1 further comprising:
walls disposed in said sheet member defining first and second elongated connection slots;
said slots being long in a direction perpendicular to said edge of said sheet member;
a mounting-plate including said flange members;
walls defining first and second holes in said mounting-plate spaced for cooperation with said first and second elongated connection slots in said wheel-plate; and
a plurality of fasteners cooperating with said first and second elongated connection slots and said first and second holes to translatably and fixably connect said wheel-plate and mounting-plate.

7. The apparatus of claim 6 further wherein said mounting-plate is formed of a single sheet of material and further including:
a fold between a planar connection portion and a wedge portion of said mounting-plate;
said fold being at an acute angle; and
opposed edges of said wedge portion being folded in a direction away from said wheel-plate to form said first and second flange members.

8. The apparatus of claim 7 further comprising:
said flange members being convergent from an area of widest separation adjacent said fold to an area of least separation adjacent an end of said wedge portion; and
said flange members being at equal and opposite angles with respect to said fold.

9. The apparatus of claim 1 further comprising:
walls disposed in said sheet member defining first and second pivot holes and first and second arcuate connection slots;
said first and second flange members each including an elongated right angle member with walls defining a hole at each end of each said member; and
a plurality of fasteners cooperating with said first and second pivot holes, said first and second connection slots and said holes in said first and second flange members to pivotably and fixably connect said first and second flange members to said wheel-plate.

10. An apparatus for converting a flexible line trimmer for use as a lawn edger comprising:
(a) a wheel-plate formed of a single first sheet of material including:
opposed first and second edges of said sheet being folded at right angles to form first and second stiffening flanges;
first and second portions of a third edge of said sheet being folded at an angle of about 135° with respect to said sheet to form first and second struts;
a wheel attached to each of said struts for rotation about an axis perpendicular to said strut;
a third portion of said third edge intermediate of said first and second portions of said third edge forming an arm;
said arm being folded at the outer portion thereof to form a lip;
walls disposed in said sheet defining first and second elongated connection slots and first and second elongated strap slots; and
said slots being long in a direction perpendicular to said third edge of said sheet;
(b) a mounting-plate formed of a single second sheet of material including:
a fold between a planar connection portion and a wedge portion of said mounting-plate;
said fold being at an included angle of about 40°;
walls defining first and second holes in said planar connection portion spaced for cooperation with said first and second elongated connection slots in said wheel-plate;
opposed edges of said wedge portion being folded at right angles in a direction away from said wheel-plate to form first and second wedging flanges;
said wedging flanges being convergent at an angle of about 50° from an area of widest separation adjacent said fold to an area of least separation adjacent an end of said wedge portion; and
said wedging flanges being at equal and opposite angles with respect to said fold;
(c) a plurality of fasteners cooperating with said first and second elongated connection slots and said first and second holes to translatably and fixably connect said wheel-plate and said mounting-plate;
(d) a strap passing through said first and second strap slots and having means for fastening the strap around the head of flexible line trimmer; and
(e) said lip, wedging flanges and strap being located to connect the apparatus to a flexible line trimmer.

11. An apparatus for converting a flexible line trimmer for use as a lawn edger comprising:
(a) a wheel-plate formed of a single first sheet of material including:
opposed first and second edges of said sheet being folded at right angles to form first and second stiffening flanges;
first and second portions of a third edge of said sheet being folded at an angle of about 135° with respect to said sheet to form first and second struts;
a wheel attached to each of said struts for rotation about an axis perpendicular to said strut;
a third portion of said third edge intermediate of said first and second portions of said third edge forming an arm;
said arm being folded at the outer portion thereof to form a lip;
walls disposed in said sheet defining first and second pivot holes, first and second arcuate connection slots and first and second elongated strap slots; and said first and second strap slots being long in a direction perpendicular to said third edge of said sheet;

(b) first and second flanges, each including an elongated right angle member with walls defining a hole at each end of each said member;

(c) a plurality of fasteners cooperating with said first and second pivot holes, said first and second connection slots and said holes in said first and second mounting flanges to pivotably and fixably connect said flanges to said wheel-plate;

(d) a strap passing through said first and second strap slots and having means for fastening the strap around the head of flexible line trimmer; and (e) said lip, flanges and strap being located to connect the apparatus to a flexible line trimmer.

* * * * *